Dec. 12, 1939.   H. J. HORN   2,183,220

VEHICLE WHEEL

Filed July 8, 1935

INVENTOR.
HARRY J. HORN

BY

Carroll R. Taber
ATTORNEY.

Patented Dec. 12, 1939

2,183,220

UNITED STATES PATENT OFFICE 2,183,220

VEHICLE WHEEL

Harry J. Horn, Lansing, Mich., assignor to Motor Wheel Corporation, Lansing, Mich., a corporation of Michigan Application July 8, 1935, Serial No. 30,260

2 Claims. (Cl. 301—37)

This invention relates to vehicle wheels and more particularly to means for detachably connecting a hub cap and/or an ornamental cover to the wheel.

The principal object of the present invention is the provision of means for varying the external ornamental appearance of a wheel by adding thereto an ornamental cover plate without necessitating any other changes or additions to the wheel.

An illustrative embodiment of the invention is shown in the accompanying drawing wherein.

Figure 1:
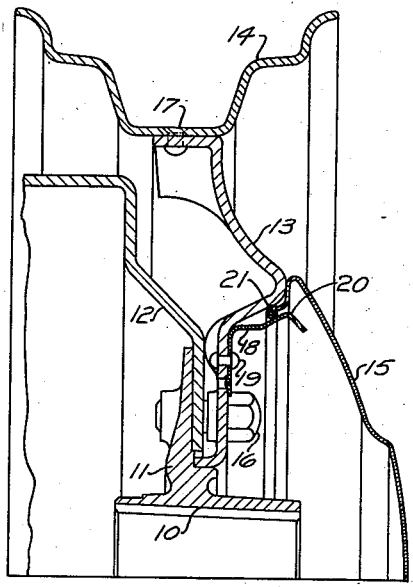
Figure 1 is a partial sectional view of a wheel showing a hub cap detachably connected thereto.

The wheel shown in Figure 1 includes a conventional hub 10 having an attaching flange 11, a brake drum 12, a wheel body 13, a rim 14, and a hub cap 15. The wheel body and brake drum are attached to the hub 10 in a conventional manner by the cap screws 16. The rim 14 is attached to the wheel body 13 by the rivets 17.

The central portion or bolting on flange of the wheel body 13 is here shown as disposed axially inwardly of the axially outermost part of the wheel body. A plurality of resilient attaching clips 18 are permanently secured to the bolting on flange by rivets 19. The attaching clips 18 are L-shape, having one leg projecting axially outwardly from the bolting on flange. This latter leg is provided adjacent its outer extremity with a deformation 20 adapted to effect interlocking engagement with an annular flange portion 21 of hub cap 15 upon the hub cap being pressed axially toward the wheel body.

Figure 2:
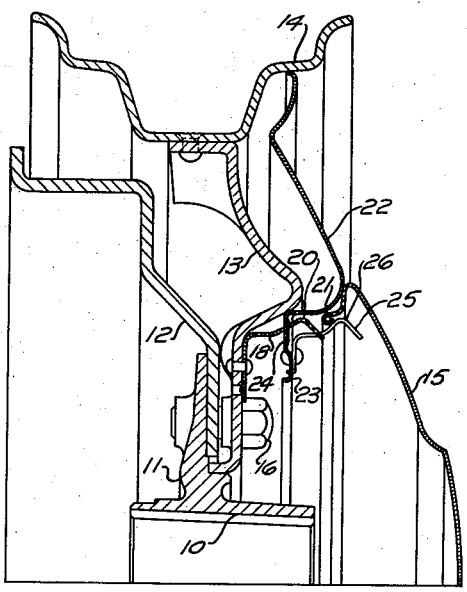
Figure 2 is a corresponding sectional view of the wheel illustrated in Figure 1 showing an ornamental cover plate detachably connected to the wheel with the hub cap of Figure 1 detachably connected to the cover plate.
Figure 3:
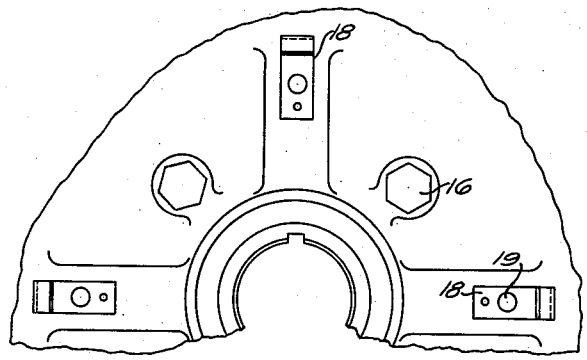
Figure 3 is a partial front view in elevation of the central portion of the wheel illustrated in Figures 1 and 2 with the hub cap and cover both removed.

Referring now to Figure 2 it will be observed that an ornamental cover 22 is positioned adjacent the outer side of the wheel to conceal the wheel body. The periphery of the cover preferably contacts the rim 14 as shown, and its central portion is depressed inwardly and provided with an opening at the bottom of the depression leaving a radially extending central portion 23 located axially inwardly of the axially outermost portion of the cover. The radial portion 23 is provided with openings 24 arranged to receive attaching clips 18 whereby to detachably connect the cover to the wheel body. Intermediate the openings 24 the radial portion 23 of the cover is provided with resilient attaching clips 25 substantially identical to the clips 18. The clips 25 are arranged with their deformed portions 26 lying in substantially the same annular zone as the deformed portions 20 of clips 18. The annular portion 21 of hub cap 15 is adapted to be pressed into interlocking engagement with the clips 25.

From the foregoing description it will be apparent that the wheel illustrated in Figures 1 and 2 may be utilized with or without an ornamental cover 22 which may be of any desired ornamental appearance. When it is used without a cover the hub cap 15 is attached directly to the attaching clips 18. When a cover is used the cover is attached to the attaching clips 18 and the hub cap is then attached to the attaching clips 25. In other words, attaching clips 18 are adapted to detachably connect to the wheel either a hub cap or a cover plate.

Figure 5:
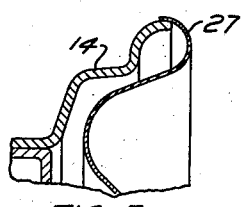
Figure 5 is a fragmentary sectional view of a wheel rim and ornamental cover showing a modified arrangement of these parts.
Figure 6:
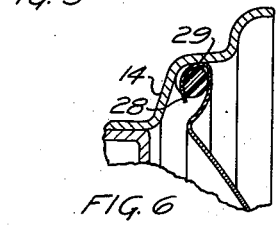
Figure 6 illustrates another arrangement of the cover and rim.
Figure 4:
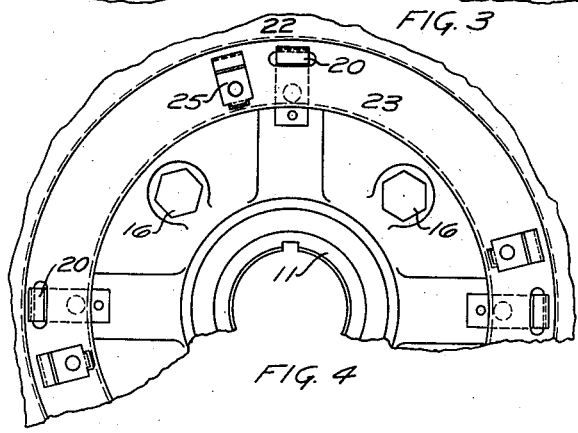
Figure 4 is a partial front elevational view of the structure shown in Figure 2 with the cover in place and the hub cap removed.
Figure 7:
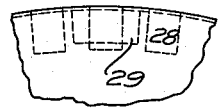
Figure 7 is a fragmentary side view of the cover shown in Figure 6.

As stated, the cover 22 may be of various ornamental designs. Likewise, the arrangement between the periphery of the cover and the rim 14 may be varied. One arrangement is shown in Figure 2. Another arrangement is shown in Figure 5 where the peripheral portion 27 of the cover is arranged to overlie the edge of the rim 14. In Figures 6 and 7 the peripheral portion of the cover is shown provided with integral fingers 28 to which is secured one or more non-metallic contact members 29. These contact members 29 are arranged to eliminate squeaks and other objectionable noises which would otherwise result if non-metallic surfaces were not used.

While only one form of the invention has been herein shown and described, it should be understood that various modifications may be employed within the scope of the invention, as defined by the appended claims.

I claim:

1. A vehicle wheel including, in combination, a wheel body having an axially dished central portion constituting a radially extending bolting on flange, a plurality of spring clips secured to the bolting on flange in circumferentially spaced relation to each other and arranged equidistant from the axis of the wheel, a cover plate arranged to conceal the wheel body radially outwardly of the bolting on flange and provided with an opening for the reception of each of said spring clips whereby to detachably connect the cover plate to the wheel body, the central portion of the cover plate being axially dished to nest within the axially dished central portion of the wheel body and being provided with a plurality of additional spring clips, said additional spring clips being circumferentially spaced from each other and each being spaced from the axis of the wheel the same distance as the first mentioned spring clips, and a hub cap for concealing the bolting on flange and all of said spring clips, said hub cap having a peripheral flange of a diameter adapting it for snap on engagement with the spring clips carried by the cover plate.

2. A vehicle wheel including, in combination, a wheel body having a central portion constituting a radially extending bolting on flange, a plurality of spring clips secured to the bolting on flange in circumferentially spaced relation to each other and arranged equidistant from the axis of the wheel, a cover plate arranged to conceal the wheel body radially outwardly of the bolting on flange and provided with an opening for the reception of each of said spring clips whereby to detachably connect the cover plate to the wheel body, the central portion of the cover plate being provided with a plurality of additional spring clips identical to the first mentioned spring clips, said additional spring clips being crcumferentially spaced from each other and each being spaced from the axis of the wheel the same distance as the first mentioned spring clips, and a hub cap for concealing the bolting on flange and all of said spring clips, said hub cap having a peripheral flange of a diameter adapting it for snap on engagement with the spring clips carried by the cover plate.

HARRY J. HORN.